Figure 1:
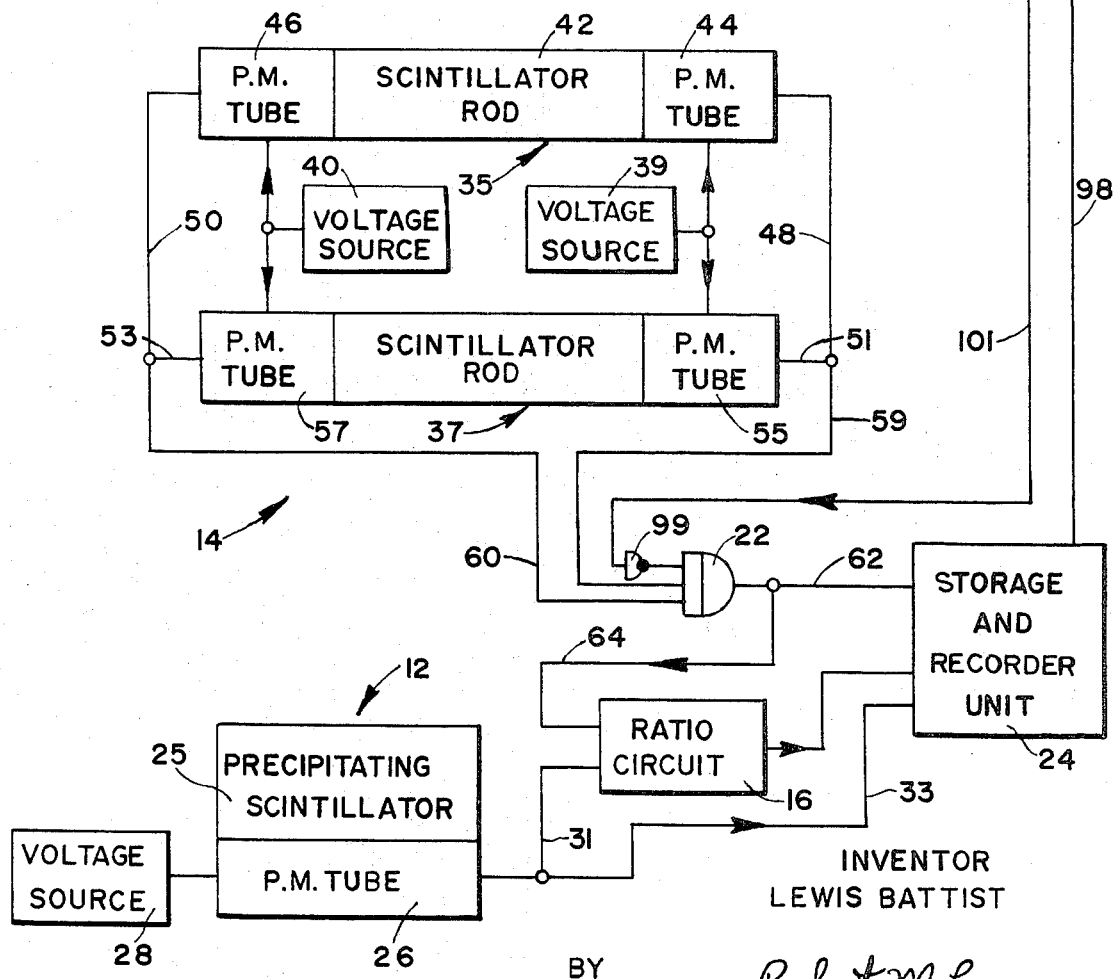

United States Patent

Battist

[11] 3,767,915
[45] Oct. 23, 1973

[54] RADIATION MONITORING SYSTEM

[76] Inventor: Lewis Battist, 9121 McDonald Drive, Bethesda, Md. 20034

[22] Filed: Oct. 14, 1970

[21] Appl. No.: 80,572

[52] U.S. Cl. 250/71.5 R, 250/43.5 MR, 250/83.6 FT
[51] Int. Cl. ............................................. G01t 1/20
[58] Field of Search ............... 250/71.5 R, 43.5 MR, 250/106 T, 83.6 FT, 83.3 R

[56] References Cited
UNITED STATES PATENTS

| | | | |
|---|---|---|---|
| 3,339,070 | 8/1967 | Main | 250/71.5 R |
| 3,336,477 | 8/1967 | Sharp | 250/71.5 R |
| 3,388,254 | 6/1968 | Haller et al. | 250/71.5 R |

Primary Examiner—Archie R. Borchelt
Attorney—Robert M. Lazo

[57] ABSTRACT

A radiation monitoring system which continuously detects and measures low levels of radiation and radioactive materials in the surrounding atmosphere comprises a large volume multiple scintillation beta radiation detector with an alpha particulate radiation scintillation detector, and with background reduction being achieved by the use of an anti-coincidence cosmic ray and high energy photon shield. The use of coincidence and anti-coincidence pulse techniques and passive logic circuitry reduce background and electronic noise. The beta radiation and alpha radiation detectors have their output connected to a ratio circuit to continuously generate an output signal indicative of the ratio of alpha radiation to beta radiation. The cosmic ray detector generates an inhibiting signal to block the output of the beta detector to prevent it from recording its response to naturally occurring cosmic radiation.

9 Claims, 3 Drawing Figures

INVENTOR
LEWIS BATTIST

RADIATION MONITORING SYSTEM

The present invention relates to a radiation monitoring system, and it more particularly relates to a system for continuously monitoring alpha and beta radiation from radioactive materials in the surrounding atmosphere.

The maximum permissible concentration of radioactive materials permitted to be released to the environment from nuclear facilities, such as nuclear power plants, research establishments, nuclear fuel reprocessing plants, manufacturing plants, medical establishments and the like, is currently regulated by federal law. Such undesirable radioactive materials include radioactive nuclides which decay by alpha and beta particle emission. For example, radionuclides decaying by the emission of alpha particles are biologically dangerous since they are "bone seekers," and thus the concentration of such isotopes from nuclear facilities are severely limited by law. In order to ascertain the level of radioactive contaminants in the atmosphere surrounding a nuclear facility, given quantities of air have been filtered near the facility to determine the concentration of radioactive materials present in airborne particles in each given quantity of air. However, gaseous radioactive components are not detected by this method, and a continuous direct measurement of the level of contamination is not possible.

Another technique, employed in nuclear power plants, has been the measuring of quantities of radioactive materials present in a portion of the effluent gases prior to discharging them to the environment. These quantities are then considered to be diluted by a given amount of air located within the immediate vicinity of the nuclear power plant. However, this method is not entirely satisfactory, since there is no assurance that a representative sample of the effluent gas and the contaminants therein has been measured. Moreover, complete or adequate dilution of the contaminants upon release to the atmosphere is presumed, but such a dilution does not always occur in practice.

In addition to the foregoing disadvantages of prior art radiation measuring techniques, the presence of naturally occurring radioactive materials and fluctuations in amount therein adversely affect the measurements made in accordance with prior art techniques. Therefore, it is desirable to be able to distinguish between natural radioactive materials and artificially produced radioactive materials emanating from nuclear facilities. In this regard, an increase in the level of activity could be due to an increase in the concentration of natural radioactive material and not due to any increase in the concentration of artificially produced radioactive materials. Naturally occurring radioactive components in the troposphere are ordinarily dominated by radioactive decay chains of the inert gases radon and thoron which are products of natural radioactive decay in the ground and which diffuse out of the earth and become part of the atmosphere. These decay chains contain both alpha-particle and beta-particle emitters. Meteorological conditions strongly affect and cause changes in the concentrations of these natural radionuclides in the atmosphere. The resulting activity decreases after a rain, or when the prevailing wind is coming from a covered region, such as the ocean or a snow-covered land mass. Thus, it would be highly desirable to have a radiation monitoring system which directly and continuously measures the concentration of gaseous and particulate radioactive materials in the surrounding atmosphere, and which takes into account fluctuations of natural radioactivity due to changes in meteorological conditions. Also, it would be desirable to have such a system which contains a minimum number of moving parts and is designed for efficient unattended operation for long periods, while requiring little or no maintenance.

Therefore, the principal object of the present invention is to provide a new and improved radiation monitoring system which directly and continuously measures the concentration of gaseous and particulate radioactive materials in the surrounding atmosphere, and which takes into account fluctuations of natural radioactivity due to changes in meteorological and other conditions.

Briefly, the above and further objects are realized in accordance with the present invention by providing a system which includes an alpha radiation detector and a beta radiation detector which have their outputs connected to a ratio circuit. The ratio circuit generates a ratio signal indicative of the ratio of the detected alpha radiation to the detected beta radiation. With no change in the amount of artificially produced radioactive materials present in the surrounding atmosphere, fluctuations of natural radioactivity do not change the ratio circuit output which would remain constant, since the ratio of the naturally-occurring alpha radiation to the naturally occurring beta radiation remains constant. Thus, any change in the output signal from the ratio detector indicates a change in the level of artificial radiation in the surrounding atmosphere. Also, greater sensitivity in the detection of the low level activity is achieved by utilizing the ratio circuit as compared to directly measuring and recording the numbers of alpha and beta particles.

In order to prevent the beta particle detector from responding to cosmic radiation or high energy gamma radiation from radioactive materials in the surrounding environment, a series of radiation detectors are located above, and partially around the beta radiation detector system. The signal obtained from the cosmic ray detector is used in anticoincidence with the signal from the beta detector, i.e., there is provided a coincidence logic circuit which has its output connected to the ratio circuit and which responds to the output of the beta detector and the absence of the output signal from a cosmic ray detector which is disposed in a sealed chamber, whereby the coincidence circuit inhibits the ratio circuit from responding to the beta detector detecting cosmic radiation.

Figure 2:
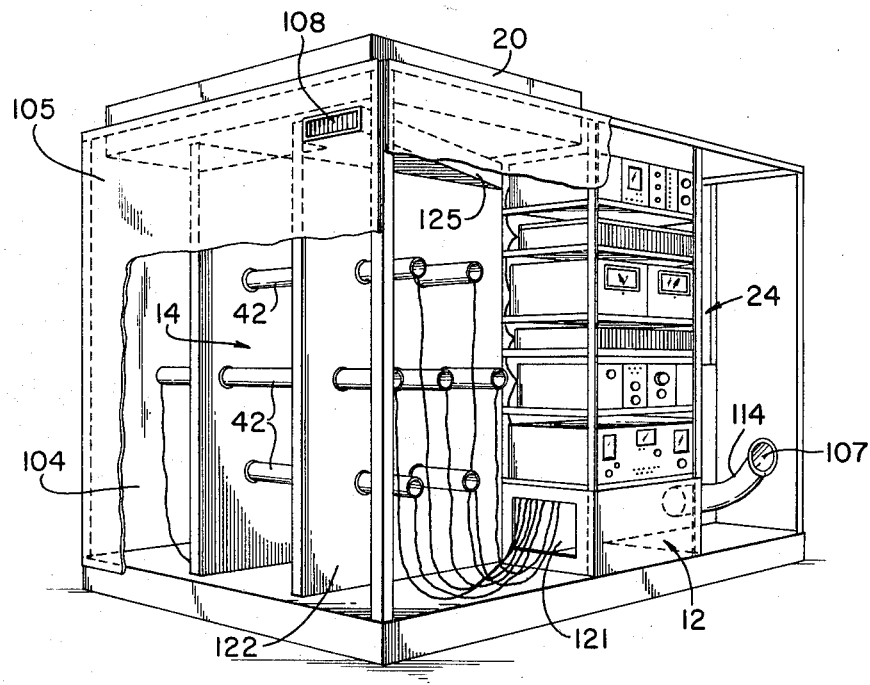
Figure 3:
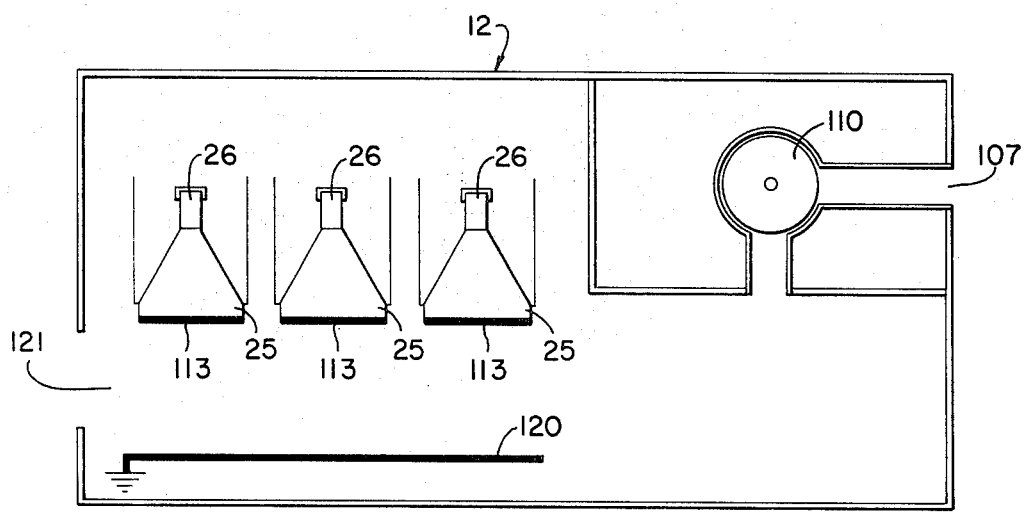

These and further objects of the present invention will be understood more fully and completely from the following detailed description when considered with reference to the accompanying drawing, FIG. 1 is a diagrammatic representation of a radiation monitoring system which incorproates the principles of the present invention;

FIG. 2 is an isometric view partially broken away which depicts a housing embodying the apparatus shown in FIG. 1; and FIG. 3 is a partially schematic view of an essentially conventional alpha detector, and illustrates the blower or fan mounted in the housing for providing a turbulent air flow past the alpha detector and into the beta detector.

Referring now to the drawing, the radiation monitoring system of the present invention generally includes an alpha radiation detector 12, a beta radiation detector 14, a ratio circuit 16 which responds to the alpha detector 12 and the beta detector 14 to generate a signal indicative of the ratio of detected alpha radiation to detected beta radiation, and a cosmic ray detector 18 which is disposed within a sealed chamber 20 to prevent the detector 18 from responding to external beta radiation and which blocks the output of the beta radiation detector 14 by inhibiting an electronic coincidence or logic AND gate 22 which is interposed between the beta radiation detector 14 and the ratio circuit 16. A storage and recorder unit 24 receives information from the alpha detector 12, the beta particle detector 14, the cosmic ray detector 18, and the ratio circuits 16 for storage and recording purposes. In operation, the alpha radiation detector 12 and the beta radiation detector 14 detect radiation and generate electrical signals which are recorded by the storage and recorder unit 24, and the ratio circuit 16 generates an output electrical signal which is indicative of the ratio of the detected alpha radiation to the detected beta radiation for storage and recording in the unit 24. This ratio remains constant during fluctuations of natural radiation, but when the ratio signal generated by the ratio circuit 16 indicates that the ratio has changed, the change of the ratio is due to artificially produced and introduced radioactive materials in the surrounding atmosphere. The ratio circuit 16 generates a ratio signal which can be either a digital-coded signal or an analog signal and which is indicative of the ratio of the number of signals received from the alpha detector 12 to the number of signals received from the beta detector 14 for a predetermined interval of time. In order to prevent the beta detector from erroneously responding to a cosmic ray instead of beta radiation, the AND gate 22 responds to an output signal from the beta detector 14 and the absence of an output signal from the cosmic ray detector 18. Thus, when the cosmic ray detector 18 detects cosmic radiation, the AND gate 22 is inhibited to prevent the beta detector 14 from generating an output signal in response to the cosmic radiation.

Considering now the system in greater detail, the alpha detector 12 comprises a precipitating scintillator 25 which generates light pulses when particles containing material which decays by emission of alpha radiation are attracted to and strikes the precipitating scintillation 25, a photomultiplier tube 26 which detects the light pulses and converts them into electrical output pulses, and a voltage source 28 which drives the photomultiplier tube 26. The output of the photomultiplier tube 26 is connected to one of the inputs of the ratio circuit 16 via a conductor 31, and the output of the photomultiplier tube 26 is also connected via a conductor 33 to the storage and recorder unit 24. The precipitating scincillator 25 is a lucite hemisphere which is coated on its bottom side with a thin layer 113 of activitated zinc sulphide. In order to make the layer electrically conducting, a conductor (not shown) in the form of a conductive inorganic reagent, such as magnesium perchlorate or in the form of a thin copper mesh, is imbedded in the zinc sulphide so that when the conductor is energized to about minus two kilovolts, it attracts the particulates to the zinc sulphide. Light pulses are emitted when the alpha radiation contacts the zinc sulphide of the precipitating scintillator 25. The photomultiplier tube 26 may be any suitable photomultiplier tube, but an Amperex XP-1000 photomultiplier tube which is operated at 1500 volts potential, and which can be obtained from Amperex Electronic Corporation of Hicksville, N.Y., is preferred. In order to distinguish a light pulse generated by alpha radiation contacting the zinc sulphide screen from a pulse generated by the photomultiplier tube due to electronic noise, beta radiation activity, or a cosmic ray, the photomultiplier tube 26 can be biased to detect only the larger signal produced in response to alpha radiation and to reject the other lower level signals. Alternatively, a limiter circuit (not shown) can be employed to mask the unwanted pulses in accordance with known techniques. In this regard, electronic noise is the source of the unwanted pulses and is generally caused by "dark currents" in the photomultiplier tube, noise pulses produced by an unstable power supply, or noisy circuit elements. It should be understood that other types of alpha detectors, such as moving filter belt systems, can be employed in place of the precipitating scintillator 25 in accordance with the principles of the present invention.

The beta detector 14 generally comprises an array of scintillator rod assemblies shown illustratively in the drawing as 35 and 37, and a pair of voltage sources 39 and 40. The scintillator rod assemblies 35 and 37 are identical to one another, and it is to be understood that only one scintillator rod assembly may be employed, or three or more scintillator rod assemblies may also be employed in accordance with the principles of the present invention. The scintillator rod assembly 35 comprises a plastic scintillator rod 42 and a pair of photomultiplier tubes 44 and 46 mounted on the opposite ends of the scintillator rod 42 to detect light pulses generated by the scintillator rod 42 when it is acted upon by radiation. The scintillator rod 42 is a solid plastic rod composed of plastic material, such as p-terphenyl plus $1-1^1$, $4-4^1$ beta phenylbutadiene in polyvinyltoluene or polystyrene as the solvent. Such a solid plastic scintillator rod can also be purchased from Amperex Electronic Corporation of Hicksville, New York and is designated as "SPF fluorescent plastic scintillator". Rods which measured from ½ to 1½ inches in diameter by approximately 8 inches long were successfully used, but it is to be understood that other sizes and shapes can also be used. Also, the number of rods is variable depending upon the sensitivity and volume of air to be monitored. It should be understood that other types of scintillator material, such as a plastic scintillator pipe having an optically coupled polymerized clear methyl methacrylate core, a liquid scintillator material, or a sodium iodide solid rod which is thalium activated, can be used in place of a solid plastic rod scintillator, in accordance with the present invention.

The photomultiplier tubes 44 and 46 detect light pulses produced by the plastic rod 42 when ionizing radiation interacts with the rod 42. The outputs 48 and 50 of the respective photomultiplier tubes 44 and 46 are connected in parallel to the respective outputs 51 and 53 of the photomultiplier tubes 55 and 57, respectively, of the scintillator rod assembly 37, and the outputs 48 and 51 are connected via a conductor 59 to one of the inputs to the AND gate 22, the outputs 50 and 53 being connected via a conductor 60 to another one of the inputs to the AND gate 22. Similarly, if additional scintillator rod assemblies are employed, their outputs would be connected in parallel with the outputs of the scintillator rod assemblies 35 and 37. The photomultiplier tubes are biased to reject noise pulses, such as pulses due to "dark currents." Also, conventional limiter circuits can be employed to reject the unwanted pulses.

In operation, when a pair of photomultiplier tubes, such as the photomultiplier tubes 44 and 46, detect a light pulse in their scintillator rod, in the absence of an output signal from the cosmic ray detector 18, the AND gate 22 is energized to supply a signal to the storage and recorder unit 24 via a conductor 62 and to supply the signal to the ratio circuit 16 via a conductor 64. By using a pair of photomultiplier tubes and by generating a signal in response to the coincidence of the energization of the pair of photomultiplier tubes, electronic noise, such as "dark currents" in one of the photomultiplier tubes, are not recorded. However, the natural background radiation is detected, since it is desirable to record this type of information. As a result, the apparatus of the present invention distinguishes between electronic noise and background radiation. Also, by utilizing a pair of photomultiplier tubes for each scintillator rod and by employing a coincidence circuit, further noise reduction is obtained. In this regard, since the time constant of the flourescence of the scintillator rod and the decay constant for the light pulse produced by the rod are small, in the order of nano-seconds, a high speed coincidence logic gate which has a switching time measured in nano-seconds can be employed by providing a pair of photomultiplier tubes mounted on opposite ends of the rod. By utilizing a separate voltage source, such as the voltage source 39, for each one of the photomultiplier tubes, such as the photomultiplier tube 44, for a scintillator rod assembly any electronic noise generated by the voltage source is not recorded, since the AND gate 22 responds only to the coincidence of a pair of signals received from a pair of photomultiplier tubes.

Considering now the cosmic ray detector 18, the detector 18 generally comprises multiple array of scintillator block assemblies; 66 and 68 are illustrative of those employed, and a pair of voltage sources 71 and 73. The scintillator block assembly 66 is identical to the scintillator block assembly 68 and comprises a scintillator block 75 having a pair of photomultiplier tubes 77 and 79 mounted on opposite ends thereof for detecting light pulses produced by the scintillator block 75 in response to cosmic radiation. The scintillator blocks, such as the scintillator block 75, are composed by plastic scintillator material which is the same as the material used in the scintillator rods of the scintillator rod assemblies 35 and 37.

An output 80 of the photomultiplier tube 79 of the scintillator block assembly 66 and an output 82 of the photomultiplier tube 84 of the scintillator block assembly 68 are connected in parallel and are connected to one of the inputs of an AND gate 86 via a conductor 88. Similarily, an output 90 of the photomultiplier tube 77 is connected in parallel with an output 92 of a photomultiplier tube 94, and the two outputs are connected to the other one of the inputs to the AND gate 86 via a conductor 96. The output of the AND gate 86 is connected to the storage and recorder unit 24 via a conductor 98 to record measurements of cosmic radiation, and the output of the AND gate 86 is also connected to the input to an inverter logic gate 99 via a conductor 101, the output of the inverter gate 99 being connected to one of the inputs to the AND gate 22.

As a result, when the cosmic ray detector 18 detects a cosmic radiation event, the inverter gate 99 is energized to inhibit the AND gate 22, whereby if the cosmic radiation is detected erroneously by the beta detector 14, the event is not erroneously recorded by the storage and recorder unit 24 as beta radiation. Thus, the cosmic ray detector 18 serves as a shield for the beta detector 14 in lieu of a cumbersome lead shield, which by necessity would be eight inches in thickness for attenuating a proton-electron cascade resulting from a shower of naturally occurring radiation from the surrounding atmosphere.

In a typical detection device incorporating the radiation monitoring system of the present invention, the alpha radiation detector and the beta radiation detector preferably are mounted within an air chamber 104 of a suitable housing 105 having an inlet 107 and an outlet 108 so that an air moving device 110 such as a fan can continuously move the air from the inlet to the outlet at a known rate past both detectors whereby the detectors can continuously measure the radiation in the air of the surrounding atmosphere. In place of the air moving device, natural circulation may also be utilized. The cosmic ray detector is contained in a sealed chamber disposed above the air chamber containing the alpha and beta detectors so as to shield the air chamber from an air shower of cosmic radiation from above. Alternatively, by employing a greater number of scintillator block assemblies, the sealed chamber containing the cosmic ray detector can entirely or at least partially surround the air chamber. In this regard, it should be understood that a greater or lesser number of scintillator block assemblies can be employed by the cosmic ray detector, and if a greater number of scintillator block assemblies are utilized, they would be connected in parallel with the assemblies 66 and 68.

The photomultiplier tubes of each one of the scintillator block assemblies are each energized by a separate voltage source so that noise signals from the voltage source are not erroneously recorded by the storage and recorder unit 24, since the AND gate 86 is only energized by the coincidence of a pair of signals generated by both of the photomultiplier tubes.

While separate pairs of voltage sources are used for the alpha detector 12, the beta detector 14, and the cosmic ray detector 18, a common pair of voltage sources can be employed for all three of the detectors as long as two different voltage sources are used with the pair of photomultiplier tubes associated with a single scintillator assembly.

Twelve scintillator rods arranged in a square array have been successfully used to monitor air containing concentrations of $10^{-10}$ microcuries per cubic centimeter of beta emitting radioactive materials. The spacing of the rods in the array depends upon the detection efficiency for fission product beta emitting radionuclides. A separation of one foot between rod centers in a square configuration results in a contained volume of air, which volume is 9.4 cubic feet in an actual embodiment of the invention.

SUMMARY OF OPERATION

A portion of the surrounding atmosphere is drawn via a suitable intake tube 114 into the alpha precipitating scintillator 25 assembly wherein particulates are electrostatically deposited on the activated zinc sulphide layer 113 which is energized to about minus 2 kilovolts as compared to the high voltage plate positive plate 120 which underlies each precipitating scintillator assembly 25 in the alpha detector 12 and the alpha activity determined. The air and gases, radioactive and otherwise contained therein, are then introduced through opening 121 into the beta detection chamber 122 containing the beta scintillation detector. Preferably, a conventional diffuser plate is employed which has openings which are spaced and sized and provided with guide vanes so as to assure uniform air flow through the chamber. The air then passes through another diffuser plate into a plenum chamber 125 from which it is exhausted to the outside environment through a suitable outlet tube 108.

The beta detector array responds to gaseous components undergoing radioactive decay by emission of a beta particle or low energy photons. Operation of the cosmic ray shield 20, beta detector 14 and alpha precipitating scintillator detector 12 and the interrelation thereof have been described above. Thus, it is seen that the information from each detector and the cosmic ray shield are input to the storage and recorder unit from which a conventional conductor assembly can be used to transmit the signal to remote readout.

While the present invention has been described in connection with a particular embodiment thereof, it will be understood that many changes and modifications of this invention may be made by those skilled in the art without departing from the true spirit thereof. Accordingly, the appended claims are intended to cover all such changes and modifications as far as the true spirit of the present invention.

What is claimed is:

1. A radiation monitoring system for the continuous detection of gaseous radionuclides which are beta and low energy photon emitters present in the surrounding atmosphere and for generating continuous signals indicative of the amount of detected radiation for storage or transmission comprising:
   a housing including an air chamber having an inlet and an outlet
   an alpha radiation detector mounted within said air chamber comprising an electrostatic depositor capable of generating signals indicative of the detection of alpha radiation from the decay of radon daughters,
   a beta radiation detector mounted within said air chamber comprising at least one scintillator body having a pair of photomultiplier tubes mounted on opposite ends thereof, capable of generating signals indicative of the continuous detection of beta and low-energy photon emitting gaseous radionuclides in air flowing through said air chamber,
   a fan mounted in said housing adapted to continuously bring in outside air and blow it from the inlet to the outlet of said air chamber past both said detectors, and
   ratio means responsive to the signals from said alpha detector and also to the signals from said beta detector for continuously generating ratio signals indicative of the ratio of the alpha indicating signals to the beta and low energy photon indicating signals whereby the concentration of gaseous radionuclides can be measured and man-made radiation in the air can be distinguished from naturually occurring background radiation.

2. A radiation monitoring system according to claim 1, further including a cosmic ray detector for generating cosmic ray-indicating signals indicative of the presence of cosmic rays, inhibiting means responsive to said cosmic ray-indicating signals and to said beta-indicating signals for inhibiting said beta-indicating signals upon the coincidence of one of said cosmic ray-indicating signals and one of said beta-indicating signals to prevent said ratio means from responding to the last-mentioned beta-indicating signal, whereby said ratio means is prevented from responding to said beta detector detecting a cosmic ray.

3. A radiation monitoring system according to claim 2, wherein said beta detector includes a scintillation detector and a pair of photomultiplier tubes operatively associated with said scintillation detector, said tubes responding to light pulses produced by said scintillation detector, and further including a pair of voltage sources individually connected to said tubes for energizing them, and wherein said inhibiting means includes coincidence means responsive to the output of said photomultiplier tubes for generating said beta-indicating signals upon the occurrence of the coincidence of said tubes responding to said scintillation detector detecting beta radiation.

4. A radiation monitoring system according to claim 3, wherein said alpha detector includes an activated zinc sulfide screen having an electrically-energizable conductive means embedded in said screen to form a precipitating scintillator, and a photomultiplier tube responsive to light pulses produced by said screen when said screen interacts with alpha radiation for generating said alpha-indicating signals.

5. A radiation monitoring system according to claim 2, wherein said beta detector further includes a plurality of scintillator assemblies having pairs of outputs, corresponding ones of said pairs of outputs being connected together in parallel and to a corresponding one of a pair of inputs to said blocking means, each one of said assemblies comprising a scintillation detector and a pair of photomultiplier tubes operatively associated with said scintillation detector for responding to light pulses produced by said scintillation detector to generate said beta-indicating signals.

6. A radiation monitoring system according to claim 3, wherein said inhibiting means comprises said coincidence means and an inverter logic gate responsive to said cosmic ray-indicating signals for inhibiting said coincidence means.

7. A radiation monitoring system according to claim 3, further including a cosmic ray detector coincidence means and a sealed chamber, wherein said cosmic ray detector is disposed within said sealed chamber and said alpha detector and said beta detector or disposed outside of said sealed chamber, said cosmic ray detector including a plurality of cosmic ray scintillator assemblies having pairs of outputs, corresponding ones of said pairs of outputs being connected together in parallel and to a corresponding one of a pair of inputs to the last-mentioned coincidence means, each of said cosmic ray assemblies comprising a cosmic ray scintillation detector and a pair of photomultiplier tubes operatively associated with said cosmic ray scintillation detector to generate said cosmic ray-indicating signals.

8. A radiation monitoring system according to claim 7, wherein said cosmic ray scintillation assembly comprising a cosmic ray scintillation detector and a pair of photomultiplier tubes operatively associated with said cosmic ray scintillation detector for responding to light pulses produced by said cosmic ray scintillation detector to generate said cosmic ray-indicating signals.

9. A radiation monitoring system according to claim 8, wherein said cosmic ray scintillation detector is comprised of elongated solid plastic members.

* * * * *